United States Patent
Chefd'hotel et al.

(10) Patent No.: US 8,411,952 B2
(45) Date of Patent: Apr. 2, 2013

(54) METHOD FOR SEGMENTING AN IMAGE USING CONSTRAINED GRAPH PARTITIONING OF WATERSHED ADJACENCY GRAPHS

(75) Inventors: Christophe Chefd'hotel, Jersey City, NJ (US); Alexis Sebbane, Lawrenceville, NJ (US)

(73) Assignee: Siemens Aktiengesellschaft, München (DE)

( * ) Notice: Subject to any disclaimer, the term of this patent is extended or adjusted under 35 U.S.C. 154(b) by 934 days.

(21) Appl. No.: 11/923,868

(22) Filed: Oct. 25, 2007

(65) Prior Publication Data
US 2008/0247646 A1   Oct. 9, 2008

Related U.S. Application Data

(60) Provisional application No. 60/910,058, filed on Apr. 4, 2007.

(51) Int. Cl.
*G06K 9/34*   (2006.01)
(52) U.S. Cl. .......................... 382/180; 382/164; 382/173
(58) Field of Classification Search .................. 382/173, 382/176–180, 164
See application file for complete search history.

(56) References Cited

U.S. PATENT DOCUMENTS

| | | | | |
|---|---|---|---|---|
| 7,609,888 B2* | 10/2009 | Sun et al. | ........................ | 382/173 |
| 8,050,498 B2* | 11/2011 | Wilensky et al. | ............. | 382/173 |
| 2005/0163375 A1* | 7/2005 | Grady | ........................... | 382/180 |
| 2005/0288916 A1* | 12/2005 | Hines | ............................... | 703/17 |
| 2007/0165949 A1* | 7/2007 | Sinop et al. | .................... | 382/173 |
| 2007/0280507 A1* | 12/2007 | Murali | ........................... | 382/107 |

OTHER PUBLICATIONS

Haris et al. ("Hybrid Image Segmentation Using Watersheds and Fast Region Merging", IEEE Transaction on Image Processing, vol. 7, No. 12, Dec. 1998, pp. 1684-1699).*

"Boykov et al. (Interactive graph-cuts for optimal boundary and region segmentation of objects in N-D images", Proceedings of ICCV 2001, pp. 105-112, 2001).*

Grady ("Random walks for image segmentation", IEEE Transactions on Pattern Analysis and Machine Intelligence, 28(11): 1768-1783, 2006. Provided as part of the IDS).*

Boykov et al. ("An experimental comparison of min-cut/max-flow algorithms for energy minimization in vision," IEEE Trans. on PAMI, vol. 26, No. 9, pp. 1124-1137, Sep. 2004).*

(Continued)

*Primary Examiner* — Yubin Hung
(74) *Attorney, Agent, or Firm* — Donald B. Paschburg (57) ABSTRACT

A method for segmenting at least a pair of regions of an image, such method comprising: obtaining data of the image; computing watersheds of the image from intensity gradients of such image data; extracting a watershed region adjacency graph from the computed watersheds, such graph comprising a plurality of nodes corresponding to the watersheds and node interconnecting edges; assigning weights to the interconnecting edges; identifying each of the pair of regions in the image; identifying the nodes corresponding to the pair of identified regions in the adjacency graph; applying constrained graph-partitioning in the adjacency graph using the edge-weights to label unmarked nodes corresponding to each one of the pair of regions; and extrapolating the obtained label nodes on the graph to the image to segment each one of the pair of regions of the image.

3 Claims, 5 Drawing Sheets

OTHER PUBLICATIONS

Schloegel et al. ("Wavefront diffusion and LMSR: Algorithms for Dynamic Repartitioning of adaptive mesh," IEEE Trans. Parallel and Distributed Systems, vol. 12, No. 5, May 2001).*

Leo Grady, Random Walks for Image Segmentation, IEEE Transactions on Pattern Analysis and Machine Intelligence, vol. 28, No. 11, Nov. 2006, pp. 1-17.

Alexiz Protiere and Guillermo Sapiro, Interactive Image Segmentation Via Adaptive Weighted Distances, IEEE Transactions on Image Processing, vol. 16, No. 4, April 2007, pp. 1046-1057.

Chefd'Hotel. Christophe et al., "Random Walk and Front Propagation on Watershed Adjacency Graphs for Multilabel Image Segmentation", *Dept. of Imaging and Visualization, Siemens Corporate Research*, Princeton, NJ, 7 pgs.

Osma-Ruiz, et al., "An improved watershed algorithm based on efficient computation of shortest paths", *Pattern Recognition* 40 2007, 1078-1090.

Rettmann, Maryam E. et al., "Automated Sulcal Segmentation Using Watersheds on the Cortical Surface", *NeuroImage* 15 2002, 329-344.

* cited by examiner

METHOD FOR SEGMENTING AN IMAGE USING CONSTRAINED GRAPH PARTITIONING OF WATERSHED ADJACENCY GRAPHS

CROSS-REFERENCE TO RELATED APPLICATIONS

This application claims priority from U.S. Provisional application No. 60/910,058 filed Apr. 4, 2007, the entire subject matter thereof being incorporated herein by reference.

TECHNICAL FIELD

This invention relates generally to image segmentation and more particularly to the use of constrained graph partitioning of watershed agency graphs to segment an image into regions identified by seeds placed on the image.

BACKGROUND AND SUMMARY

As is known in the art, it is frequently desirable to detect and segment an image into meaningful regions, allowing for instance to distinguish an object from a background of other objects and/or from a background of noise. One application, for example, is in CT or MRI where it is desired to segment an anatomical feature of a human patient, such as, for example, a vertebra of the patient. In other cases it would be desirable to segment a moving, deformable anatomical feature such as the heart.

As is also known in the art, a watershed transform, originating in the field of topography, is a traditional tool of mathematical morphology used to partition an image into disjoint regions with homogeneous intensity values. A watershed segmentation algorithm typically consists of defining an elevation map corresponding to the image gradient magnitude, and computing its catchment basins through immersion or rain fall simulations.

A known issue with this technique is that noise, as well as other variations of intensity that do not correspond to object boundaries, produce spurious local minima in the image gradient magnitude which result in oversegmentation. This phenomenon is illustrated in FIGS. 1(*a*) to 1(*f*) with a CT image FIG. 1*a*, its gradient magnitude FIG. 1*b* and the corresponding watershed regions FIG. 1*c*.

One way to mitigate this problem is to select, interactively or automatically, specific minima that yield catchment basins corresponding to the desired objects. Another simple solution is to regularize the gradient image to limit its number of extrema. An example is shown where the gradient image is filtered with a Gaussian kernel FIG. 1*e* and a new watershed partition is computed FIG. 1*f*. While a more meaningful segmentation is obtained, additional steps would still be required to produce an anatomically relevant labeling of the image. A thorough discussion on the combination of multiscale analysis and watersheds is available in a paper entitled by J. Gauch entitled Image segmentation and analysis via multiscale gradient watershed hierarchies. *IEEE Transactions on Image Processing*, 8(1):69-79, 1999.

Another strategy consists of considering the initial watershed regions as building blocks that can be assembled to produce a higher level description of the data. The starting point for such methods is the adjacency graph of the watershed regions. Introducing edge-weights corresponding to region dissimilarity measures, one can easily obtain a series of segmentations by selecting and merging iteratively neighboring regions with the highest affinity. A fast implementation of this approach is discussed in Hybrid image segmentation using watersheds and fast region merging. *IEEE Transactions on Image Processing*, 7(12):1684-1699, 1998 by Haris et al. In the same setting, one can also formulate the grouping of watershed regions as a labeling of the adjacency graph, using for instance a Markovian relaxation method as described in Segmenting internal structures in 3D MR images of the brain by Markovian relaxation on a watershed based adjacency graph. In *Proceedings of ICIP* 1995, pages 548-551, 1995 by Geraud et al. FIG. 1 illustrates the iterative region merging method, starting with the partition shown in FIG. 1*c* and arbitrarily stopping when 8 regions remain. Assuming the goal is to segment the image into anatomical regions, this result appears more satisfactory than partition FIG. 1*f*. However, such a fully automated approach allows little flexibility to incorporate application-specific knowledge. What if, in the previous example, the user also wants to segment the heart from the rest of the soft tissue?

It is first noted that the number of watershed regions in the CT image shown is less than 10% its number of pixels. Similar results can be observed on a broad range of real images. These regions provide a decomposition of the image into building blocks that appear very suitable for segmentation tasks: they do not cross over image boundaries and contain pixels with similar intensity values. Based on these observations, we use here the watershed transform as a "morphological" dimensionality reduction step for graph-based segmentation algorithms. In addition, we choose to incorporate prior knowledge by constraining the segmentation process with markers scribbled by the user over various regions of interest and their background.

Adding interactivity and user inputs to guide the segmentation seems to be a natural solution to this problem. Starting with the intelligent scissors algorithm described in Interactive segmentation with intelligent scissors. *Graphical Models and Image Processing*, 60(5):349-384, 1998 by Mortensen et al., an increasing body of work is now dedicated to semi-automatic techniques for image segmentation.

As is also known in the art, one technique used in object segmentation uses algorithms based on seeds (or scribbles or marks) placed by the user over regions of interest (i.e., the object). The "graph cuts" algorithm described in "Interactive graph-cuts for optimal boundary and region segmentation of objects in N-D images" *In Proceedings of ICCV* 2001, pages 105-112, 2001 by Boykov et al, for instance, finds a minimum weight cut between foreground and background seeds set by the user on the image lattice. A multilabel partitioning method based of the probability that a "random walker" evolving on the image first reaches a seed with a given label has been described by Grady in Random walks for image segmentation. *IEEE Transactions on Pattern Analysis and Machine Intelligence*, 28(11): 1768-1783, 2006. A third method is the marker-based geodesic partitioning algorithm implemented by Protiere and Sapiro, see Interactive image segmentation via adaptive weighted distances. *IEEE Transactions on Image Processing*, 16(4): 1046-1057, 2007, using linear time Hamilton-Jacobi solvers.

In accordance with the present invention, a method is provided for segmenting at least a pair of regions of an image, such method comprising: obtaining data of the image; computing watersheds of the image from intensity gradients of such image data; extracting a watershed region adjacency graph from the computed watersheds, such graph comprising a plurality of nodes corresponding to the watersheds and node interconnecting edges; assigning weights to the interconnecting edges; identifying each of the pair of regions in the image;

identifying the nodes corresponding to the pair of identified regions in the adjacency graph; applying constrained graph-partitioning in the adjacency graph using the edge-weights to label unmarked nodes corresponding to each one of the pair of regions; and extrapolating the obtained label nodes on the graph to the image to segment each one of the pair of regions of the image.

In one embodiment, the constrained graph-partitioning comprises using competing wavefronts, each one of the wavefronts emanating from a corresponding node and propagating outwardly from such node to interconnected nodes at a rate related to the edge weights interconnecting such nodes.

In one embodiment, the constrained graph-partitioning comprises using a random walker algorithm. In this embodiment the random walker algorithm comprises: defining regions containing markers as internal boundaries; computing the Laplacian matrix of the adjacency graph using the edge-weights to produce probability maps; and partitioning the adjacency graph using the probability maps.

Thus, instead of performing the segmentation in the original image data domain where a pixel-by-pixel analysis is performed using a comparison of intensity differences between adjacent pixels, here, in accordance with the invention, segmentation is performed in the adjacency graph domain and then the segmented region on the graph is transformed back into the original image data domain. That is, the user identifies large plural pixel regions of similar intensity using watersheds and then constructs the adjacency graph where the plural pixel watersheds are identified as nodes and where contiguous nodes are interconnected with weighted edges related to relative intensity between adjacent watersheds (i.e., plural containing pixel nodes). The user identifies the region of interest in the original image data domain with one type of mark and unwanted adjacent to the regions of interest with a different type of mark. The seed marks in the region of interest are expanded and the seeds marks in the unwanted region are also expanded until they collide at the boundary or border of the desired region to thereby segment the desired region of interest from the unwanted regions. This segmentation process is this performed in the adjacency graph domain and then, once segmented in the adjacency graph the segmented region transformed into the original image data domain. The relative intensity data is contained in the adjacency graph by the edge weights. The process of expanding each of the regions to include other node in the region of interest and those in the unwanted regions is performed by constrained graph partitioning. In one embodiment competing wavefronts is used, each one of the wavefronts emanating from a corresponding node and propagating outwardly from such node to interconnected nodes at a rate related to the edge weights interconnecting such nodes. In another embodiment, the constrained graph-partitioning comprises uses a random walker algorithm. In this embodiment the random walker algorithm comprises: defining regions containing markers as internal boundaries; computing the Laplacian matrix of the adjacency graph using the edge-weights to produce probability maps; and partitioning the adjacency graph using the probability maps.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

General

Our general segmentation framework is composed of the following steps:
1. Obtain the image gradient magnitude using a finite-difference stencil.
2. Compute watersheds using the rain simulation algorithm recently proposed by Osma-Ruiz in "An improved watershed algorithm based on efficient computation of shortest paths. *Pattern Recognition*, 40, 2007".
3. Extract the watershed region adjacency graph and compute regional features (number of pixels, average intensity value).
4. Compute initial edge-weights based on the region dissimilarity function proposed in a paper entitled "A stepwise optimization approach. *IEEE Transactions on Pattern Analysis and Machine Intelligence*", 1 1(2):150-163, 1989 by J. Beaulieu and M. Goldberg and described below in connection with Equations (1), (2) and (3).
5. Set regions (nodes) containing markers with user-assigned labels.
6. Apply a constrained graph-partitioning technique to label the remaining nodes of the adjacency graph.
7. Extrapolate the obtained labels to the original image.

Figure 1A:
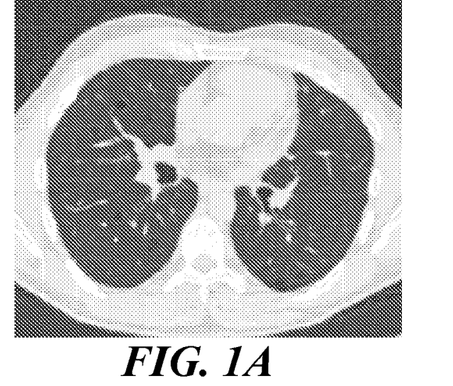
FIG. 1(a) is an original image.
Figure 1B:
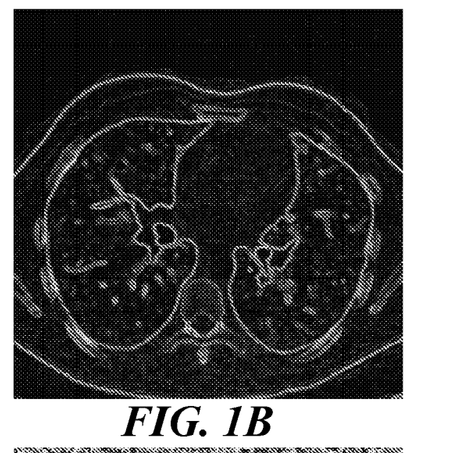
FIG. 1(b) shows the gradient magnitude of the image of FIG. 1(a)
Figure 1C:
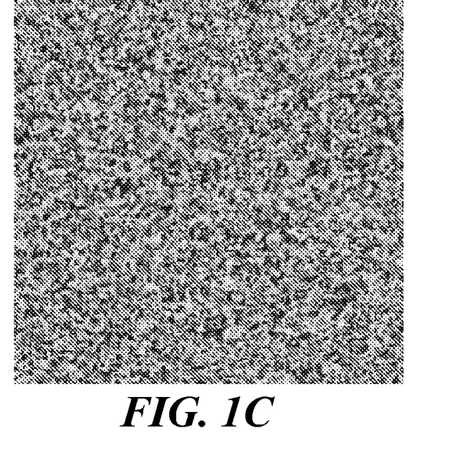
FIG. 1(c) shows watershed regions of the image of FIG. 1(a)
Figure 1D:
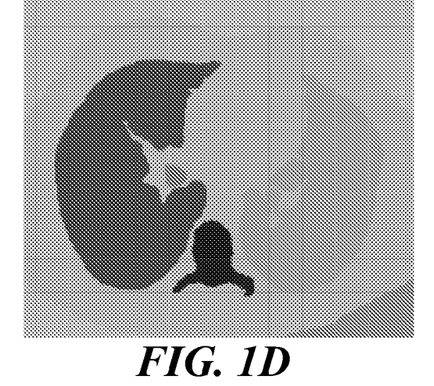
FIG. 1(d) shows hierarchical merging of the watershed regions of FIG. 1(c)
Figure 1E:
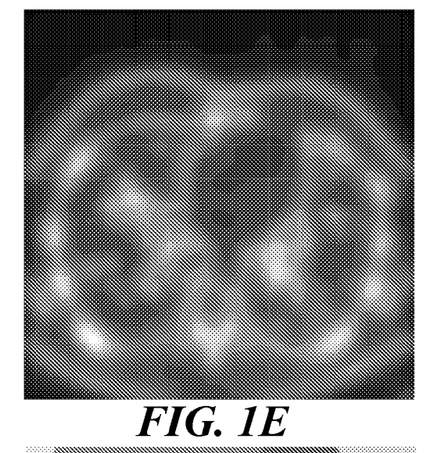
FIG. 1(e) shows regularized gradient magnitude of the image.
Figure 1F:
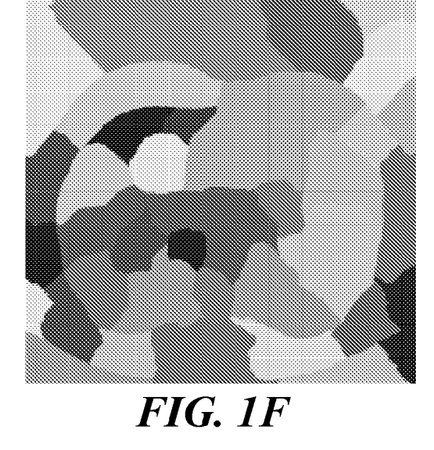
FIG. 1(f) shows watershed regions computed from the regularized image gradient magnitude of FIG. 1(e)
Figure 2:
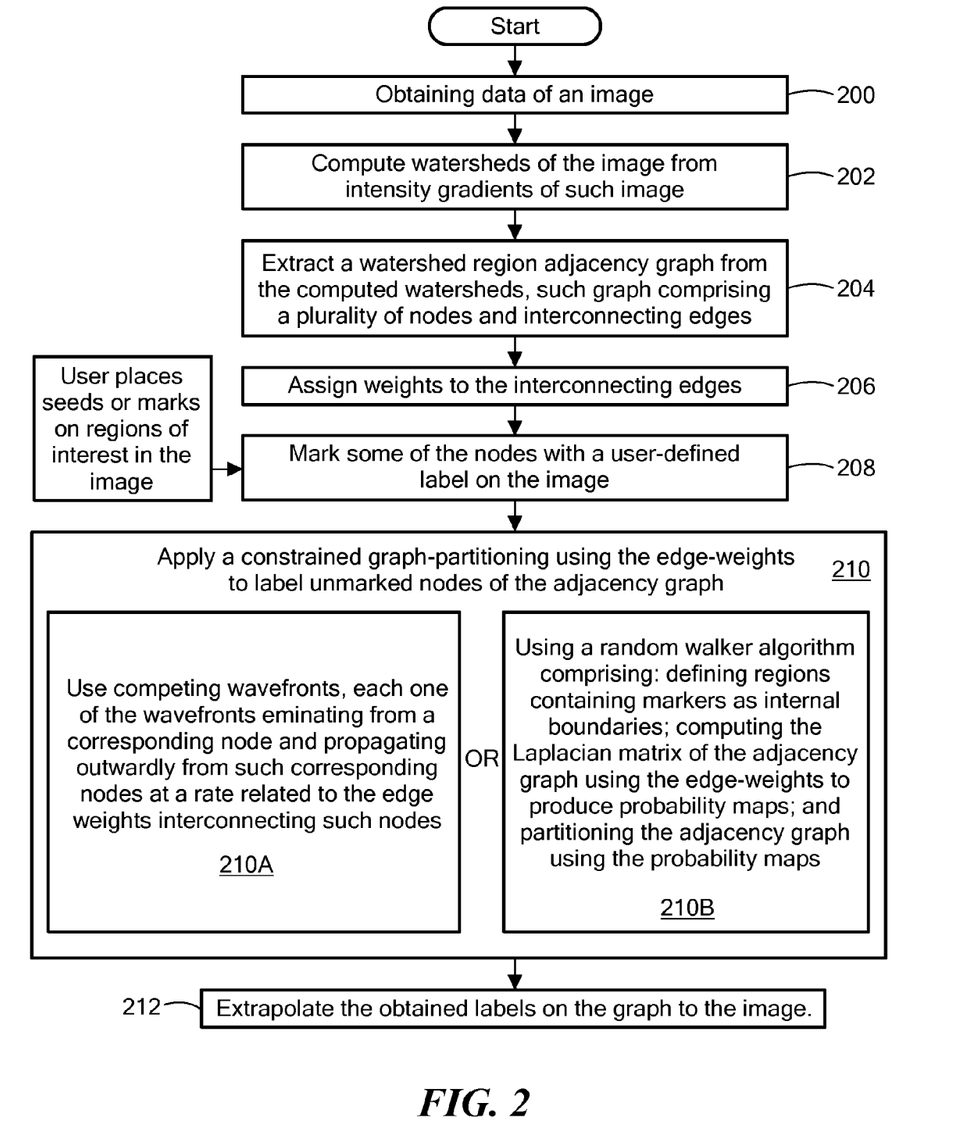
FIG. 2 is a flow chart of the process for segmenting a selected region of an image according to the invention.

Thus, referring to FIG. 2, the method for segmenting a selected region of an image comprises: obtaining data of the image, such as data from the image shown in FIG. 1(a), Step 200. From the image data, the process computes watersheds (labeled A-Z and A1-G1 in FIG. 3) of the image from intensity gradients of such image data, Step 202.

Figure 3:
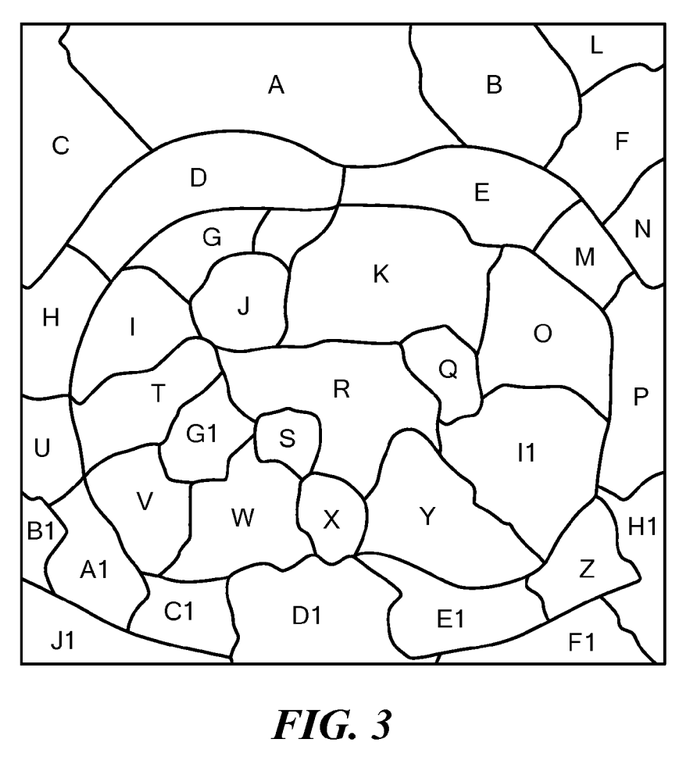
FIG. 3 is a watershed region adjacency graph used in the process according to the invention.
Figure 4:
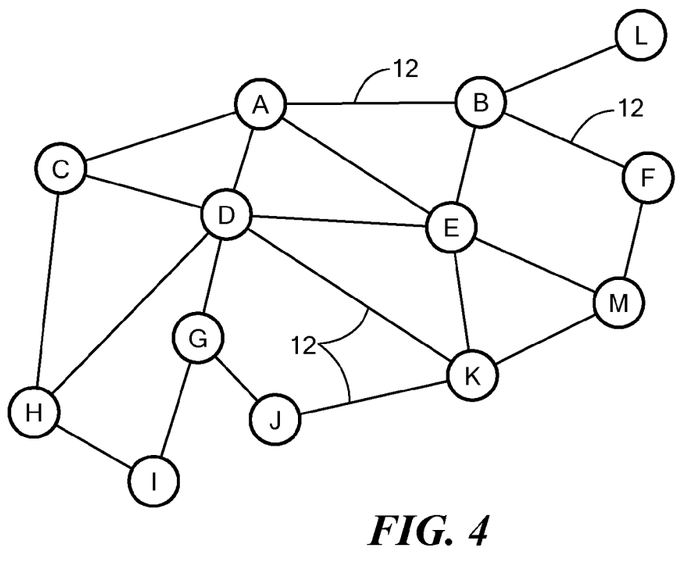
FIG. 4 shows constrained graph-partitioning of the watershed region adjacency graph of FIG. 3.

The process next extracts a watershed region adjacency graph (FIG. 4) from the computed watersheds (labeled A-Z and A1-G1 in FIG. 3), such graph comprising a plurality of nodes, only a portion, here nodes A-M being shown in FIG. 4) also corresponding to the watersheds A-Z and A1-G1 in FIG. 3 and node interconnecting edges 12, Step 204. It is noted from FIG. 3 that, for example, watershed region A is contiguous to watershed regions B, C, D and E; but is not contiguous to the other watershed regions. Thus, in FIG. 4, interconnecting edges 12 are constructed between node A and nodes B. C, D and E; but is to the other nodes. The edges 12 are assigned weights, Step 206 (FIG. 2) here, for example based on the region dissimilarity function proposed in a paper entitled "A stepwise optimization approach. *IEEE Transactions on Pattern Analysis and Machine Intelligence*", 1 1(2):150-163, 1989 by J. Beaulieu and M. Goldberg, see below and equations (1)-(3).

Figure 5:
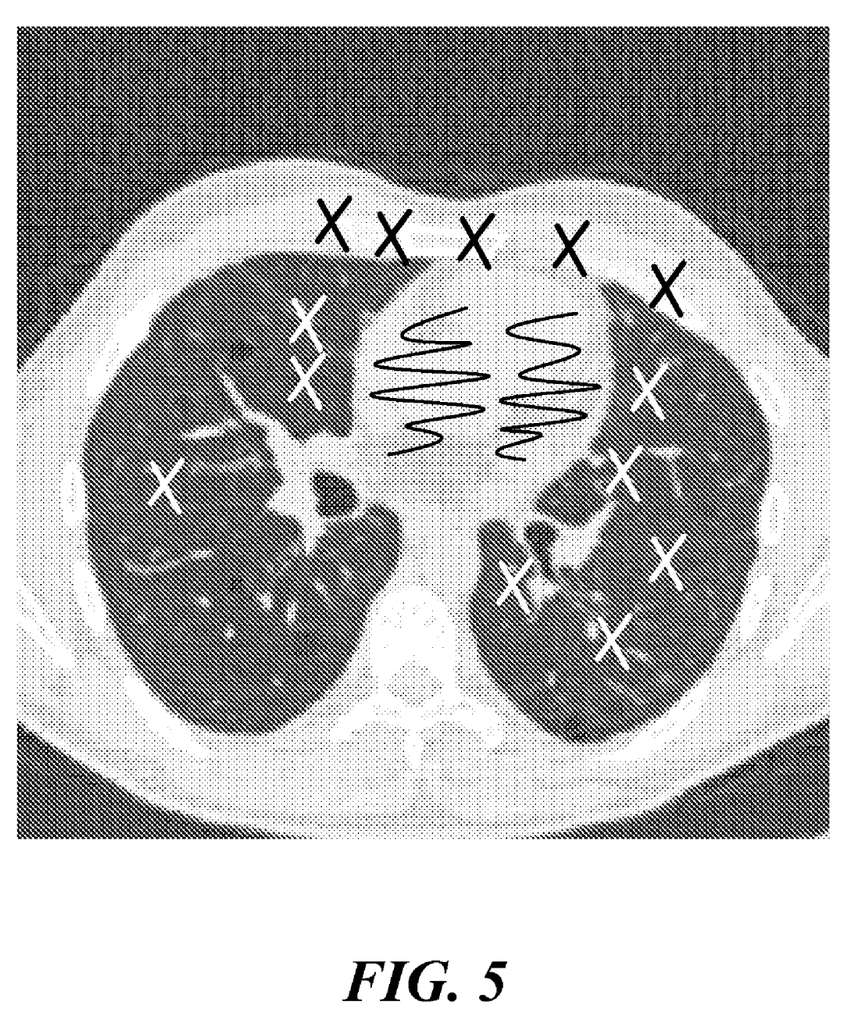
FIG. 5 shows user identified marks placed on a selected region to be segmented according to the invention.

Next, a user marks or places one type of seeds or marks 16 (i.e. labels 16) on the selected region of interest in the original image shown in FIG. 5 here for example, the heart which is includes nodes K. Q and R and places a different type of seed marks on adjacent unwanted regions, here the upper portion of the rib cage and lungs, which includes nodes D and E as well as G, I, J and Q. These are user defined user-defined labels 16, Step 208. These seeds or marks identify the corresponding ones of the nodes in the watershed region adjacency graph (FIGS. 5 and 3). Next, the process applies constrained graph-partitioning using the edge-weights to label unmarked nodes of the adjacency graph, Step 210.

The Step 210 of applying constrained graph-partitioning uses the edge-weights on the interconnected edges 12 to label unmarked nodes of the adjacency graph belonging to the user selected regions (i.e., seeds 16) is performed, in one embodiment, by using competing wavefronts, each one of the wavefronts emanating from a corresponding node and propagating outwardly from such corresponding node to interconnected nodes at a rate related to the edge weights interconnecting such nodes.

For example, referring to the FIG. 4, a wavefront emanates from the corresponding marked nodes, here nodes D and E and a wavefront emanates from node E. The wavefronts propagate at a rates proportional to the weights of the edges 12 until the wavefronts collide along a boundary of the selected region being segmented, Step 210A, or, in another embodiment, by use of a random walker algorithm comprising: defining regions containing markers as internal boundaries; computing the Laplacian matrix of the adjacency graph using the edge-weights to produce probability maps; and partitioning the adjacency graph using the probability maps, Step 210B.

Figure 6:
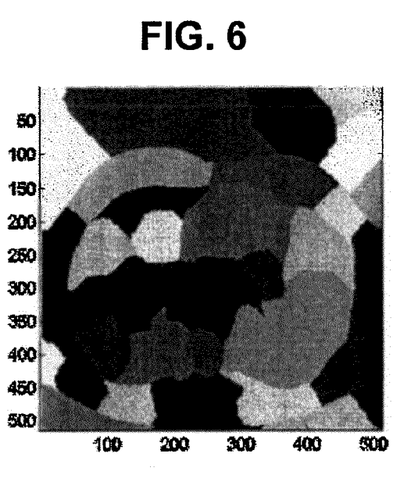
FIGS. 6 and 7 show a watershed partition before and after using a region growing algorithm to produce a tessellation of the watershed partition into smaller sections.

For a simplified example, reference is made to FIG. 6 where node 2 is in a wanted region and node 5 is in an unwanted region. Wavefronts 30, 32 propagate from each one of the nodes 2, 5, respectively at rates proportional to the edges weights. The propagation continues until the two waves collide which is the boundary 34 of the wanted region. Thus, in this manner the nodes, here nodes 1, 2, 4, 6, and 7 included in the wave emanating from node 2 are regions included in the desired region thereby segmenting the desired region from the unwanted regions. The segmented region is then transformed from the adjacency graph domain to the original image data domain. That is, the process extrapolates the obtained labels on the graph (i.e., the boundary of the selected region of the image to be segmented) to the original image data to thereby segment the selected region of the image, Step 212. Thus, the watersheds corresponding to nodes 1, 2, 4, 6 and 7 are segmented from the watersheds corresponding to nodes 3 and 5 in the image.

More particularly, the watershed algorithm proposed in "An improved watershed algorithm based on efficient computation of shortest paths", Pattern Recognition, 40, 2007. by Osma-Ruiz, J. Godino-Llorente, N. S aenz-Lech on, and P. G omez-Vilda was chosen for two reasons. First, it has a lower computational complexity and execution time than previously proposed methods. Second, it also provides a true image partition into catchment basins without the watershed lines produced by Vincent and Soille's immersion technique. We use the dissimilarity function discussed in the paper in a paper entitled "A stepwise optimization approach. *IEEE Transactions on Pattern Analysis and Machine Intelligence*", 11(2):150-163, 1989 by J. Beaulieu and M. Goldberg which is derived from the variance of intensity values within a region (squared error E of an approximation by the average intensity). Dissimilarity is measured by comparing the approximation error of the union of two regions with sum of their individual approximation errors:

$$D(R_i, R_j) = E(R_i \cup R_j) - E(R_i) - E(R_j) \quad (1)$$

$$= \frac{n_i \cdot n_j}{n_i + n_j}(\mu_i - \mu_j)^2, \quad (2)$$

where $n_k$ and $\mu_k$ represents respectively the number of pixels and intensity average of region $R_k$. For two pixels, this criterion reduces to the squared difference of their intensity values. We represent the watershed partition using a region adjacency graph. It is an undirected graph G=(V, E), where V is the set of nodes representing regions and E ⊂ V×V is the set of edges corresponding to adjacent regions. Each edge is endowed with a weight $$\omega_{i,j} = f(D(R_i, R_j)), \quad (3)$$

where $f$ is an arbitrary function. We use an array of adjacency lists to represent G. In this setting, we formulate the segmentation problem as assigning one of K labels to each node, given a set of pre-assigned nodes defined by user inputs. This task can also be formulated as a constrained graph partitioning problem.

Thus, instead of performing the segmentation in the original image data domain where a pixel-by-pixel analysis is performed using a comparison of intensity differences between adjacent pixels, here, in accordance with the invention, segmentation is performed in the adjacency graph domain and then the segmented region on the graph is transformed back into the original image data domain. That is, the user identifies large plural pixel regions of similar intensity using watersheds and then constructs the adjacency graph where the plural pixel watersheds are identified as nodes and where contiguous nodes are interconnected with weighted edges related to relative intensity between adjacent watersheds (i.e., plural containing pixel nodes). The user identifies the region of interest in the original image data domain with one type of mark and unwanted adjacent to the regions of interest with a different type of mark. The seed marks in the region of interest are expanded and the seeds marks in the unwanted region are also expanded until they collide at the boundary or border of the desired region to thereby segment the desired region of interest from the unwanted regions. This segmentation process is this performed in the adjacency graph domain and then, once segmented in the adjacency graph the segmented region transformed into the original image data domain. The relative intensity data is contained in the adjacency graph by the edge weights. The process of expanding each of the regions to include other node in the region of interest and those in the unwanted regions is performed by constrained graph partitioning. Here two alternative constrained graph partitioning are used: the random walk method proposed by Grady referred to above, and a geodesic partitioning technique inspired from recent PDE-based segmentation methods by A. Protiere and G. Sapiro: Interactive image segmentation via adaptive weighted distances. *IEEE Transactions on Image Processing*, 16(4):1046-1057, 2007. Both are detailed in the following sections.

Random Walk and Graph Labeling

As noted above, the method: obtains data of the image; computes watersheds of the image from intensity gradients of such image data; extracts a watershed region adjacency graph from the computed watersheds, such graph comprising a plurality of nodes corresponding to the watersheds and node interconnecting edges; assigns weights to the interconnecting edges; a user places marks on the image within the selected region of the image; identifies the one of the nodes corresponding to the marks placed on the image and applying constrained graph-partitioning using the edge-weights to label unmarked nodes of the adjacency graph associated with the selected region to identify unmarked nodes corresponding to the selected region of the image; and extrapolates the obtained labels on the graph to the segment the selected region of the image.

Here, the constrained graph-partitioning comprises using a random walker algorithm. In this embodiment the random walker algorithm comprises: defining regions containing markers as internal boundaries; computing the Laplacian matrix of the adjacency graph using the edge-weights to produce probability maps; and partitioning the adjacency graph using the probability maps.

More particularly, the method uses the random walk method described by Grady and referred to above, consists of computing the probability that a "random walker", starting at an arbitrary node, first reaches a pre-assigned node with a particular label.

The starting node is then given the label with the highest probability. It can be shown that these probabilities can be computed in a totally deterministic fashion by solving a series of combinatorial Dirichlet problems with internal boundary conditions. The idea is to minimize an energy of the form $$D[x] = \frac{1}{2}\sum_{(i,j)\in E} \omega_{i,j}(x_i - x_j)^2 = \frac{1}{2}x^T L x, \quad (4)$$

where L is the Laplacian matrix of G defined by $$L_{i,j} = \begin{cases} \sum_{k\in N(i)} \omega_{i,j}, & \text{if } i = j, \\ -\omega_{i,j}, & \text{if } j \in N(i), \\ 0, & \text{otherwise}, \end{cases} \quad (5)$$

and N(i) contains the indices of vertices adjacent to the i-th node. This matrix is symmetric and positive definite. With suitable boundary conditions, the solution to this problem corresponds to the probability that each node belongs to a given class. For K labels, one needs to solve K−1 Dirichlet problems, the last one deriving from the probabilities summing to 1. In order to incorporate the constraints, one can split the vertices into two complementary subsets $V_M$ and $V_U$ representing respectively marked and unmarked nodes. It is then easy to permute indices such that L is reordered with an upper left block corresponding to the pre-assigned nodes:

$$L = \begin{pmatrix} L_M & B \\ B^T & L_U \end{pmatrix}. \quad (6)$$

Then, for a label $s\in\{1, \ldots, K\}$, one defines a potential vector $m_s$ for all nodes in $V_M$. Its components are set to 1 if they are assigned to s, 0 otherwise. Finally, the solution of the constrained Dirichlet problem on $V_U$ is given by the solution y of the following linear system:

$$L_U y = -B m_s. \quad (7)$$

It corresponds to the probability of each of the remaining unmarked nodes to belong to the class s.

Here we apply this technique to the adjacency graph described in above. We set its edge-weights to $$\omega_{i,j} = f(D(R_i, R_j)) = \exp\left(-\beta \frac{D(R_i, R_j)}{\max_{(k,l)\in E} D(R_k, R_l)}\right). \quad (8)$$

The choice of β is empirical. The value 400 is used in all our experiments. We use a conjugate gradient solver with a Jacobi preconditioner to obtain the solution of Eq. 7 [G. Golub and C. V. Loan. *Matrix Computations*. North Ox-ford Academic, 2nd edition, 1986]. The Laplacian matrix is sparse and is stored using a compressed representation. Note that the original random walk method was implemented on image lattices, which yields a problem of much larger dimensions, but facilitates taking advantage of a better structured Laplacian matrix.

Geodesic Partitioning by Front Propagation

Here, the method extracts a segmentation of the image using the computed watershed region adjacency graph comprises using competing wavefronts, each one of the wavefronts emanating from a corresponding node and propagating outwardly from such node to interconnected nodes at a rate related to the edge weights interconnecting such nodes.

More particularly, given an arbitrary metric on the adjacency graph, a node is given the label of its closest pre-assigned node. In our case, the distance computation is naturally based on a metric induced by the dissimilarity between regions. It results in what we call a "geodesic" partition of the adjacency graph. This would correspond to a weighted Voronoi diagram in the Euclidean space.

Similar techniques, implemented on the image grid, are discussed by P. Arbel aez and L. Cohen. Energy partitions and image segmentation. *Journal of Mathematical Imaging and Vision*, 20(1/2):43-57, 2004, as well as in more recent papers by Sapiro (see A. Protiere and G. Sapiro. Interactive image segmentation via adaptive weighted distances. *IEEE Transactions on Image Processing*, 16(4):1046-1057, 2007 and L. Yatziv and G. Sapiro. Fast image and video colorization using chrominance blending. *IEEE Transactions on Image Processing*, 15(5): 1120-1 129, 2006]. The idea of building a segmentation method by computing the cost of a path between two pixels is also a key ingredient of the fuzzy-connectedness framework presented by J. Udupa and P. Saha. Fuzzy connectedness and image segmentation. *Proceedings of the IEEE*, 91(10), 2003. In the lattice-based algorithms described by A. Protiere and G. Sapiro. Interactive image segmentation via adaptive weighted distances. *IEEE Transactions on Image Processing*, 16(4): 1046-1057, 2007, weighted distance maps are computed using an efficient Hamilton-Jacobi solver for eikonal equations. We use here a slightly modified Dijkstra's algorithm with multiple source nodes, an approach which is similar to the distance calculations on lattices discussed by L. Yatziv and G. Sapiro. Fast image and video colorization using chrominance blending. *IEEE Transactions on Image Processing*, 15(5):1120-1 129, 2006.

The pre-assigned nodes form the roots of spanning trees obtained by adding one edge at a time, always taking the next edge that gives the shortest path from the root nodes to an unmarked node. These spanning trees do not need to be explicitly represented. Nodes are marked using labels propagated from the roots. A priority queue helps finding quickly the next edge to the vertex with the shortest distance to any of the pre-assigned nodes. We refer to R. Sedgewick. *Algorithms in C*. Addison-Wesley, 3rd edition, 2002 for a description and implementation of the required abstract data types. Given multiple disjoint sets of initial nodes, the fringe of their growing spanning trees can be seen as competing wavefronts propagating throughout the graph and colliding to form a graph partition.

In this algorithm, we define the edge weights $\omega_{i,j}$ using a function $f$ of the form $z \mapsto$ $\mid \rightarrow f(z)=z+\epsilon$ where $\epsilon$ is an arbitrarily small value.

A number of embodiments of the invention have been described. Nevertheless, it will be understood that various modifications may be made without departing from the spirit and scope of the invention. Accordingly, other embodiments are within the scope of the following claims.

The calculations of the presented invention were made using a 2.5 GHz XEON computer. The distance between regions are computed using a metric of the form d(R1, R2)=H (R1 U R2)−H(R1)−H(R2) where H is a measure of variance. It reduces to (i1-i2)2 for two pixels. In the random walker implementation, the conjugate gradient matrix-multiply operation is parallelized. A Jacobi preconditioner is used.

Tessellation

Figure 7:
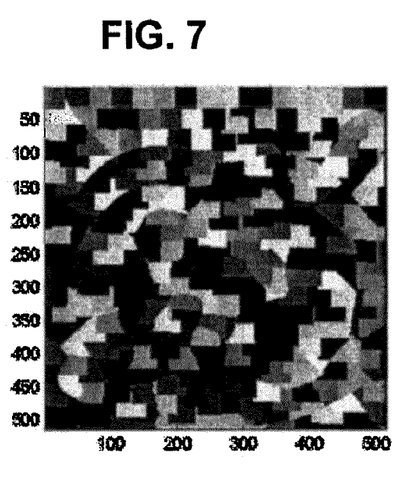

In some applications, one may want to adjust the granularity of the initial watershed partition. In this case, we use a simple region growing algorithm to produce a tessellation of the watershed partition into smaller subsets or portions (between steps 2 and 3 of the previous algorithm. FIG. 6 shows the initial watershed partition and FIG. 7 shows the watershed partition following application of the region growing algorithm.

Several examples were computed using a dual 2.5 GHz XEON. In the Random Walker implementation, the conjugate gradient matrix-multiply operation is parallelized. A Jocobi preconditioner was used.

In a first example, a 512×512 photograph of a woman was segmented using a random walker segmentation in accordance with the teachings of this invention. Three labels were used and a computation time of about 1 second was achieved. A maximum region size after tessellation was not set.

In a second example, the 512×512 photograph of the women was segmented using a competing wavefront segmentation in accordance with the teachings of this invention. Three labels were used and a computation time of about 0.3 seconds was achieved. A maximum region size after tessellation was not set.

In a third example, a 512×512 CT Slice was segmented. The random walker segmentation approach was used in accordance with the teachings of this invention and five labels were used. A maximum region size after tessellation was not set. The processing time was about 3 seconds.

In a fourth example, a 512×512 empty image was segmented. A random walker segmentation approach was used in accordance with the teachings of this invention and four labels were used. A maximum region size after tessellation was set at 10 pixels. The processing time was about 2.8 seconds.

In a fifth example, a 512×512 image of a gate was segmented. A random walker segmentation approach was used in accordance with the teachings of this invention and three labels were used. A maximum region size after tessellation was set at 10 pixels. The processing time was about 2.7 seconds.

In a sixth example, a 512×512 image of a gate was segmented. A competing wavefront segmentation approach was used in accordance with the teachings of this invention and three labels were used. A maximum region size after tessellation was set at 10 pixels. The processing time was about 0.7 seconds.

In a seventh example, a 3D 128×128×128 image was segmented. A random walker segmentation approach was used in accordance with the teachings of this invention and five labels were used. The processing time was about 41 seconds.

What is claimed is:

1. A computer implemented method for segmenting at least a pair of regions of a digital image, the method performed by the computer comprising:
    obtaining data of the image, the image data containing of a plurality of data elements;
    determining an image gradient magnitude of the image using a finite-difference stencil;
    computing a plurality of watersheds of the image from intensity gradients of such image data based on computation of shortest paths using a rain simulation algorithm;
    performing a region growing procedure on the plurality of watersheds to produce a tessellation of the plurality of watersheds into smaller portions;
    extracting a watershed region adjacency graph from the smaller portions, such graph comprising:
        a plurality of nodes corresponding to the smaller portions; and
        node interconnecting edges;
    assigning a weight to each interconnecting edge based on the dissimilarity of the nodes that are connected by the interconnecting edge;
    identifying the nodes corresponding to the at least a pair of identified smaller portions in the adjacency graph;
    marking each of a plurality of the identified smaller portions with one of at least a first and a second foreground seeds;
    applying a competing wavefronts process to the nodes in the adjacency graph by using the edge weights to label unmarked nodes in accordance with the first and second foreground seeds and extrapolating the obtained labeled nodes on the graph to the image to segment the image, wherein each wavefront propagates from a node with a rate that depends on an edge weight related to the node and until the competing wavefronts collide along a boundary of a region being segmented.

2. A computer implemented method for segmenting at least a pair of regions of a digital image, said method performed by the computer comprising:
    obtaining data of the image;
    computing watersheds of the digital image using a rain simulation algorithm;
    performing a region growing procedure on the computed watersheds to produce a tessellation of the computed watersheds into smaller portions;
    transforming the smaller portions to an adjacency graph comprising a plurality of nodes and a plurality of node interconnecting edges, wherein each node corresponding to one of the smaller portions;
    assigning a weight to each node-interconnecting edge;
    identifying the nodes corresponding to at least a pair of smaller portions in the adjacency graph;
    marking each of a plurality of the identified nodes with one of at least a first and a second foreground labels prior to segmenting the adjacency graph;
    applying a competing wavefront process wherein each calculated competing wavefronts emanates from a first node to interconnected nodes at a rate related to the edge weights associated with the interconnected nodes and an unmarked node is marked according to the label of a marked node that is closest to the unmarked node.

3. A computer implemented method for segmenting at least a pair of regions of a digital image, said method performed by the computer comprising:

obtaining data of the image;

computing watersheds of the image from image data using a rain simulation algorithm;

performing a region growing procedure on the plurality of watersheds to produce a tessellation of the plurality of watersheds into smaller portions;

transforming the smaller portions to an adjacency graph comprising a plurality of nodes and a plurality of node-interconnecting edges, wherein each node corresponding to one of the smaller portions;

assigning a weight to each node-interconnecting edge;

identifying the nodes corresponding to at least a pair of smaller portions in the adjacency graph and marking each of a plurality of the identified nodes with one of at least a first and a second foreground labels prior to segmenting the adjacency graph;

applying a segmentation process to the adjacency graph using the assigned weights and the identified nodes, wherein the segmentation process is a competing wavefronts process.

* * * * *